United States Patent
Jung et al.

(10) Patent No.: US 9,188,774 B2
(45) Date of Patent: Nov. 17, 2015

(54) MICROELECTROFLUIDIC DEVICE AND METHOD OF DRIVING THE SAME

(75) Inventors: Kyu-dong Jung, Suwon-si (KR); Jong-hyeon Chang, Suwon-si (KR); Min-seog Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 317 days.

(21) Appl. No.: 13/616,572

(22) Filed: Sep. 14, 2012

(65) Prior Publication Data
US 2013/0114120 A1 May 9, 2013

(30) Foreign Application Priority Data
Nov. 4, 2011 (KR) .................. 10-2011-0114506

(51) Int. Cl.
*G02B 26/02* (2006.01)

(52) U.S. Cl.
CPC .......... *G02B 26/02* (2013.01); *G02B 2207/115* (2013.01)

(58) Field of Classification Search
CPC . G02B 26/005; G02B 26/02; G02B 2207/115
USPC .................. 359/228, 237, 290–291, 295, 665
See application file for complete search history.

(56) References Cited

U.S. PATENT DOCUMENTS 8,861,092 B2 * 10/2014 Lee et al. ................. 359/665

FOREIGN PATENT DOCUMENTS

| JP | 2006-285031 A | 10/2006 |
| JP | 2007-25601 A | 2/2007 |
| KR | 10-2005-0109943 A | 11/2005 |
| KR | 10-2008-0029870 A | 4/2008 |

OTHER PUBLICATIONS

C. Gary Tsai et al., "Circular dielectric liquid iris", Optics Letters, vol. 35, No. 14, Jul. 15, 2010, pp. 2484-2486, Optical Society of America.

* cited by examiner

*Primary Examiner* — James Phan
(74) *Attorney, Agent, or Firm* — Sughrue Mion, PLLC

(57) ABSTRACT

A microelectrofluidic device includes: a chamber; a first fluid and a second fluid which are contained in the chamber and are not mixable with each other; and a first electrode group including a plurality of electrodes that are disposed on an inner side of the chamber, and to which a voltage is applied to change an interface between the first fluid and the second fluid, wherein the plurality of electrodes are connected to form a first electrode unit, a second electrode unit, and a third electrode unit that are independently turned on or off, and the plurality of electrodes are annular and coated with an insulating material, and adjacent electrodes are connected to different electrode units.

23 Claims, 15 Drawing Sheets

MICROELECTROFLUIDIC DEVICE AND METHOD OF DRIVING THE SAME

CROSS-REFERENCE TO RELATED APPLICATIONS

This application claims priority from Korean Patent Application No. 10-2011-0114506, filed on Nov. 4, 2011, in the Korean Intellectual Property Office, the disclosure of which is incorporated herein in its entirety by reference.

BACKGROUND

1. Field

The present disclosure relates to microelectrofluidic devices for modulating incident light in a microelectrofluidic manner and methods of driving the microelectrofluidic devices.

2. Description of the Related Art

Recently, a technology that modulates incident light in a microelectrofluidic manner has been attracting attention.

For example, a technology that adjusts and controls transmission of light in a microelectrofluidic manner has been introduced. A technology that adjusts and controls transmission of light is widely used in driving an aperture or shutter of an apparatus for obtaining an image, or in driving each pixel in an apparatus for displaying an image.

Variable apertures that may be used in existing optical systems are driven by manipulating several metal blades. However, mechanical motion, friction, and use of moving machinery elements restrict miniaturization.

Also, a technology that controls the curvature of a lens that collects or disperses incident light in a microelectrofluidic manner has been introduced. The curvature of a lens surface and a material that is used to form a lens determine a focal distance of the lens, and demand for a lens system that has a variable focus function to obtain a better image is increasing. The variable focus function is used for autofocusing or zooming, and a structure using a method of mechanically moving a location of some lenses that constitute a lens system by using, for example, a motor restricts miniaturization.

SUMMARY

Embodiments provide microelectrofluidic devices that modulate incident light using a fluid flow and include an electrode group structure for easy voltage control and methods of driving the microelectrofluidic devices.

According to an aspect of an embodiment, there is provided a microelectrofluidic device including: a chamber; a first fluid and a second fluid which are contained in the chamber and are not mixable with each other; and a first electrode group a first electrode group including a plurality of electrodes that are disposed on an inner side of the chamber, and to which a voltage is applied to change an interface between the first fluid and the second fluid, wherein the plurality of electrodes are connected to form a first electrode unit, a second electrode unit, and a third electrode unit that are independently turned on or off, and the plurality of electrodes are annular and coated with an insulating material, and adjacent electrodes of the plurality of electrodes are connected to different electrode units.

The first electrode group may have a single-layer array structure.

From among the electrodes, electrodes that are located in (3 k)th places (where k is a natural number) in a direction away from a center of the first electrode group constitute a first electrode unit; from among the electrodes, electrodes that are located in (3 k-1)th places (where k is a natural number) from the center constitute a second electrode unit; and from among the electrodes, electrodes that are located in (3 k-2)th places (where k is a natural number) from the center constitute a third electrode unit.

Adjacent facing surfaces of the electrodes may have uneven patterns that intervene between each other.

The first fluid includes a light-shielding material and the second fluid may include a light-transmitting material, and according to a position change of the interface between the first fluid and the second fluid, the size of an aperture that transmits incident light is controlled.

One of the first fluid and the second fluid includes a polar material and the other one includes a non-polar material.

The chamber may include: a bottom substrate having an upper surface on which the first electrode group is disposed; an intermediate plate that is disposed above and spaced apart from the bottom substrate and includes a first through-hole that forms a flow path for the first fluid at a center portion of the intermediate plate and a second through-hole that forms a flow path for the second fluid at a circumference portion of the intermediate plate; a top substrate that is disposed above and spaced apart from the intermediate plate; and a spacer that surrounds a space formed between the bottom substrate and the top substrate.

A second electrode group may be further formed on a lower surface of the intermediate plate, wherein the second electrode group has the same electrode array as that of the first electrode group.

An opaque pattern portion is further formed on a center of a surface of the top substrate, wherein the opaque pattern portion shields light that has passed through the aperture.

The microelectrofluidic device may further include a ground electrode that is located in a position of a surface of the bottom substrate in which the ground electrode contacts a polar fluid among the first fluid and the second fluid.

In the microelectrofluidic device, the first fluid and the second fluid include light-transmitting materials, each having a different refractive index, the interface between the first fluid and the second fluid in the chamber includes a first surface that constitutes a lens surface and a second surface that contacts the electrode group, and according to how a voltage applied to the first electrode group is controlled, the position of the second surface is changed, thereby changing the curvature of the lens surface.

The first fluid may include a polar material and the second fluid may include a non-polar material.

The chamber may include: a bottom substrate having an upper surface on which the first electrode group is disposed; an intermediate plate that is disposed above and spaced apart from the bottom substrate and includes a first through-hole that forms a lens diameter corresponding to the lens surface at a center portion of the intermediate plate and a second through-hole that forms a flow path for the second fluid at an circumference portion of the intermediate plate; a top substrate that is disposed above and spaced apart from the intermediate plate; a spacer that surrounds a space formed between the bottom substrate and the top substrate.

A second electrode group may be further formed on a lower surface of the intermediate plate, wherein the second electrode group has the same electrode array as that of the first electrode group.

The microelectrofluidic device may further include a ground electrode that is located in a position of a surface of the bottom substrate in which the ground electrode contacts a polar fluid among the first fluid and the second fluid.

The microelectrofluidic device may further include a second intermediate plate interposed between the bottom substrate and the first intermediate plate, wherein the second intermediate plate includes through-holes respectively corresponding to the first and second through-holes of the first intermediate plate. The microelectrofluidic device may further include a third electrode group on an upper or lower surface of the second intermediate plate, wherein the third electrode group has the same electrode array as that of the first electrode group.

According to an aspect of another embodiment, there provided is a method of changing a location of an interface between a first fluid and a second fluid that are not mixable and are contained in a chamber of in a microelectrofluidic device, wherein the microfluidic device includes an electrode group including a plurality of electrodes that have different annular shapes and are spaced apart from each other, the method including controlling the electrodes to have the same voltage as any one of a first electrode unit, a second electrode unit, and a third electrode unit which are independently turned on or off, wherein adjacent electrodes among the electrodes are controlled according to different electrode units.

The electrode group may have a single-layer array structure.

From among the electrodes, electrodes that are located in (3 k)th places (where k is a natural number) in a direction away from the center of the electrode group are controlled according to the first electrode unit; from among the electrodes, electrodes that are located in (3k-1)th places (where k is a natural number) from the center are controlled according to the second electrode unit; and from among the electrodes, electrodes that are located in (3 k-2)th places (where k is a natural number) from the center are controlled according to the third electrode unit.

The turning on or off of the first electrode unit, the second electrode unit, and the third electrode unit may be simultaneously performed without transient switching.

The first fluid may include a light-shielding material while the second fluid includes a light-transmitting material, and according to the position of the interface between the first fluid and the second fluid, the size of an aperture that transmits incident light is controlled.

Also, the first fluid and the second fluid may include light-transmitting materials, each having a different refractive index. The interface between the first fluid and the second fluid in the chamber includes a first surface that constitutes a lens surface and a second surface that contacts the electrode group. According to how a voltage applied to the first electrode group is controlled, the position of the second surface is changed, thereby changing the curvature of a lens surface.

BRIEF DESCRIPTION OF THE DRAWINGS

The above and/or other aspects will become apparent and more readily appreciated from the following description of embodiments, taken in conjunction with the accompanying drawings in which.

DETAILED DESCRIPTION

Figure 1:
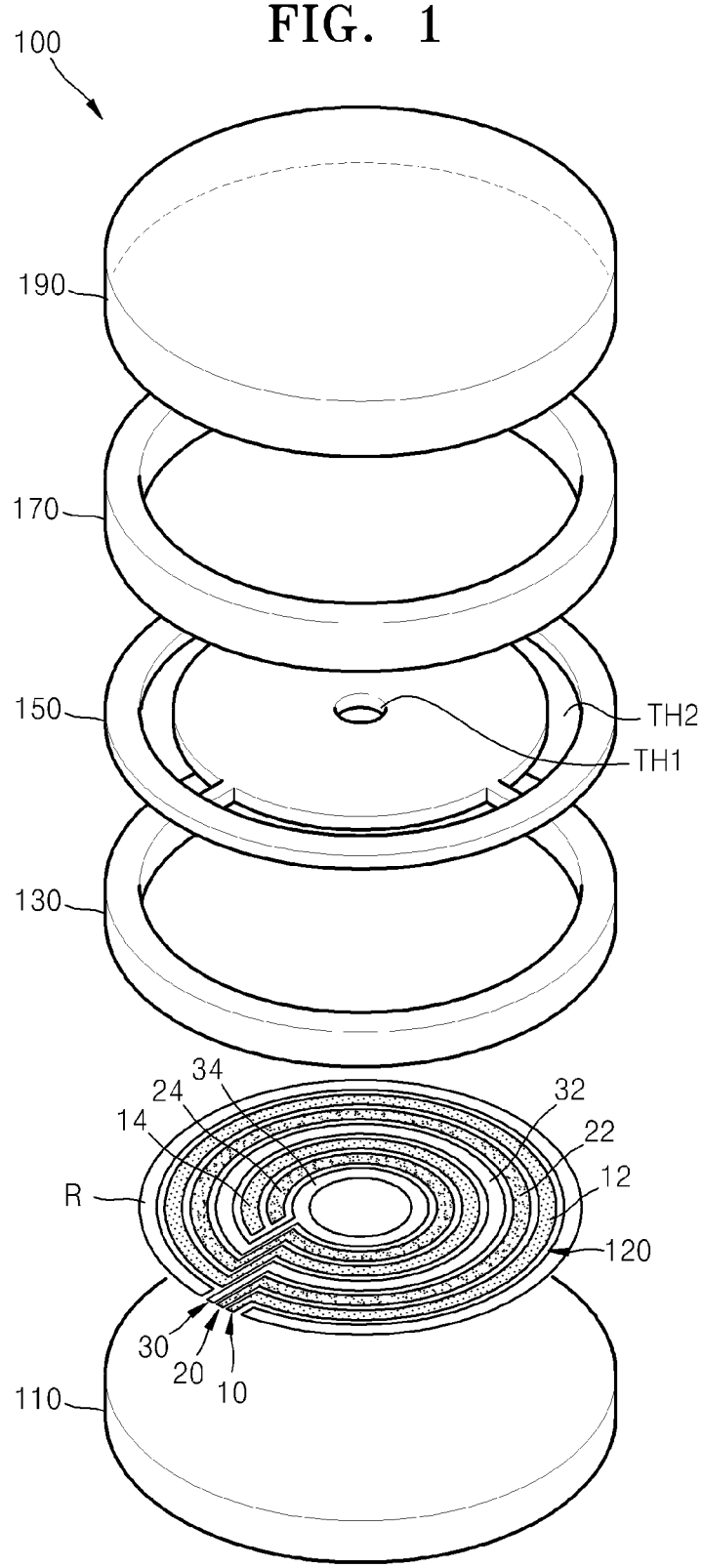
FIG. 1 is an exploded perspective schematic view of a microelectrofluidic device according to an embodiment.

Reference will now be made in detail to embodiments, examples of which are illustrated in the accompanying drawings. In the drawings, like reference numerals refer to like elements throughout and sizes of the respective elements may be exaggerated for clarity and convenience. In this regard, the exemplary embodiments may have different forms and should not be construed as being limited to the descriptions set forth herein. Accordingly, the exemplary embodiments are merely described below, by referring to the figures, to explain aspects thereof.

Microelectrofluidic devices according to exemplary embodiments include two fluids that are not mixable in a chamber that forms a space in which fluids flow, and a boundary between the fluids is moveable due to electrowetting. As an electrode group structure for fluid flow, three electrode modes that are independently turned on and off are used to efficiently and easily control fluid flow.

A microelectrofluidic device may be used as, for example, a device for controlling an aperture that transmits incident light or a device for controlling the curvature of a lens that collects or disperses incident light. FIGS. 1 to 7 illustrate examples of a microelectrofluidic device as an aperture adjusting device, and FIGS. 8 to 13B illustrate examples of a microelectrofluidic device as a lens curvature adjusting device. However, examples of the microelectrofluidic device are not limited thereto.

Figure 2:
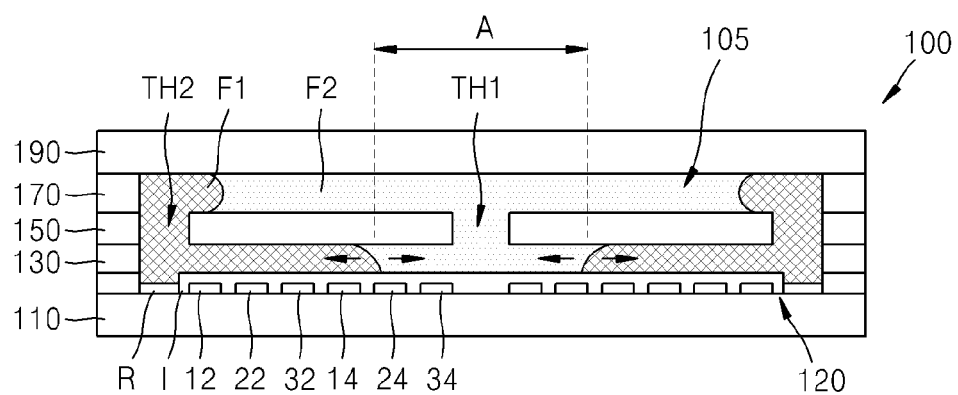
FIG. 2 is a schematic cross-sectional view of the microelectrofluidic device of FIG. 1.

FIG. 1 is an exploded perspective schematic view of a microelectrofluidic device 100 according to an embodiment, and FIG. 2 is a schematic cross-sectional view of the microelectrofluidic device 100 of FIG. 1. Also, FIGS. 3A to 3F are enlarged views of a portion of the microelectrofluidic device 100 of FIG. 2 showing that voltage control of an electrode group controls fluid flow in such a manner that the size of an aperture A that transmits light is decreased in an microelectrofluidic device 100. FIGS. 4A to 4F are enlarged views of a portion of the microelectrofluidic device 100 showing that voltage control of an electrode group controls fluid flow, which is controlled in such a manner that the size of an aperture A that transmits light is increased in the microelectrofluidic device 100. In the perspective view of FIG. 1, some of the constituting elements are not illustrated for convenience.

Referring to the drawings described above, the microelectrofluidic device 100 includes a first fluid F1 and a second fluid F2 that are not mixable in a chamber 105, wherein one of the first and second fluids F1 and F2 has a light-transmitting property and the other one has a light-shielding property. In an exemplary embodiment, one of the first and second fluids F1 and F2 has polarity and the other one has non-polarity. For example, the first fluid F1 may be a polar fluid that shields light and the second fluid F2 may be a non-polar fluid that has a light-transmitting property, and the light-transmitting second fluid F2 is disposed at the center portion of the chamber 105 while the light-shielding first fluid F1 is disposed at the circumference portion of the chamber 105. The chamber 105 contains an electrode group that applies voltage to form an electric field that controls an interface between the first fluid F1 and the second fluid F2. Thus, according to the flows of the first fluid F1 and the second fluid F2, the size of the aperture A may be changed, thereby controlling transmittance of incident light.

The structure and operation of the microelectrofluidic device will now be described in detail.

The chamber 105 accommodates the first fluid F1 and the second fluid F2, and may include a bottom substrate 110, an intermediate plate 150 that is disposed above and spaced apart from the bottom substrate 110, a top substrate 190 disposed above and spaced apart from the intermediate plate 150, and a spacer surrounding a space formed between the bottom substrate 110 and the top substrate 190. The spacer may include a first spacer 130 disposed between the bottom substrate 110 and the intermediate plate 150 and a second spacer 170 disposed between the intermediate plate 150 and the top substrate 190.

The first fluid F1 and the second fluid F2 may form fluid interfaces in a region between the bottom substrate 110 and the intermediate plate 150 and a region between the intermediate plate 150 and the top substrate 190. Due to the movement of the fluid interfaces, the size of the aperture A may be controlled, as described below.

A first electrode group 120 includes a plurality of electrodes 12, 22, 32, 14, 24, and 34 that are coated with an insulating material I and may be disposed on the bottom substrate 110. The electrodes of first electrode group 120 may form a first electrode unit 10, a second electrode unit 20, and a third electrode unit 30 which are independently turned on or off, and from among the electrodes 12, 22, 32, 14, 24, and 34, adjacent electrodes may be connected to different electrode units.

The first electrode group 120 may have a single-layer array structure, in consideration that transmittance of a transparent electrode material is in a range of about 80 to about 85%, and thus, in the case of multiple-layer structures, transmittance may be deteriorated. As illustrated in FIG. 1, from among the electrodes 12, 22, 32, 14, 24, and 34, electrodes that are located in $(3 k)^{th}$ places (where k is a natural number) in a direction away from the center of the first electrode group 120, for example, the electrode 14 located in a third place from the center and the electrode 12 located in a sixth place from the center, are connected to each other to constitute a first electrode unit 10. Electrodes that are located in $(3 k-1)^{th}$ places (where k is a natural number) from the center, for example, the electrode 24 located in a second place from the center and the electrode 22 located in a fifth place from the center, are connected to each other to constitute a second electrode unit 20. Electrodes that are located in $(3 k-2)^{th}$ places (where k is a natural number) from the center, for example, the electrode 34 located in a first place from the center and the electrode 32 located in a fourth place from the center, are connected to each other to constitute a third electrode unit 30.

The number of the electrodes that constitute the first electrode group 120, and the shape and array of the electrodes are not limited to those shown in FIG. 1. The electrodes may be arranged in any type of array as long as adjacent electrodes are connected to different electrode units, and the electrodes may have various shapes, such as circular or polygonal shapes.

A ground electrode R may be disposed in at least one portion of the inside of the chamber 105, and maintains its contact with a polar fluid. For example, the ground electrode R may be disposed and maintain its contact with the polar first fluid F1, and as illustrated in FIG. 1, may be disposed on the bottom substrate 110.

The intermediate plate 150 may be disposed spaced apart from the bottom substrate 110 and may have a first through-hole TH1 that is disposed at the center portion of the intermediate plate 150 and forms a flow path for the second fluid F2, and a second through-hole TH2 that is disposed at the circumference portion of the intermediate plate 150 and forms a flow path for the first fluid F1. The number or shape of the second through-holes TH2 is not limited to the microelectrofluidic device 100 illustrated in FIG. 1.

The bottom substrate 110, the intermediate plate 150, and the top substrate 190 may be formed of a light-transmitting material.

The electrodes of the first electrode group 120 may be formed of a transparent conductive material, for example, a metal oxide, such as indium tin oxide (ITO), indium zinc oxide (IZO), or the like, a thin film in which metallic nanoparticles, such as gold (Au), silver (Ag), or the like, are dispersed, a carbon nanostructure, such as carbon nanotube (CNT), graphene, or the like, or a conductive polymer, such as poly 3,4-ethylenedioxythiophene (PEDOT), polypyrrole (PPy), poly(3-hexylthiophene) (P3HT), or the like.

The ground electrode R does not need to be light-transmitting due to its location, and may be formed of a metal thin film including, for example, gold (Au), silver (Ag), aluminum (Al), chromium (Cr), titanium (Ti), or the like.

The microelectrofluidic device 100 according to this embodiment controls the size of the aperture A by electrowetting, wherein the first electrode group 120 is provided to digitally control the size of the aperture A. As used herein, the term "electrowetting" refers to a phenomenon in which when a voltage is applied to an electrolyte droplet on an electrode coated with an insulating material, the contact angle of the electrolyte droplet changes. That is, at a three-phase contact line (TCL) where a fluid, a droplet, and an insulating material join together, the contact angle is changed according to the respective interfacial tensions. Thus, when electrowetting is used, fluid flow may be readily and effectively controlled using a low voltage, and a fluid may be reversibly transported and controlled.

When an appropriate amplitude of voltage is applied to electrodes of the first electrode group 120, an electromechanical force may occur at a TCL, that is, a tangent line where the first fluid F1, the second fluid F2, and the insulating material I join together, on the activated electrodes. As such, the first fluid F1 moves toward the center or edge of the chamber 105, thereby narrowing or enlarging the aperture A.

The diameter change of the aperture A according to control of the first electrode group 120 will be described in detail below.

Figure 3A:
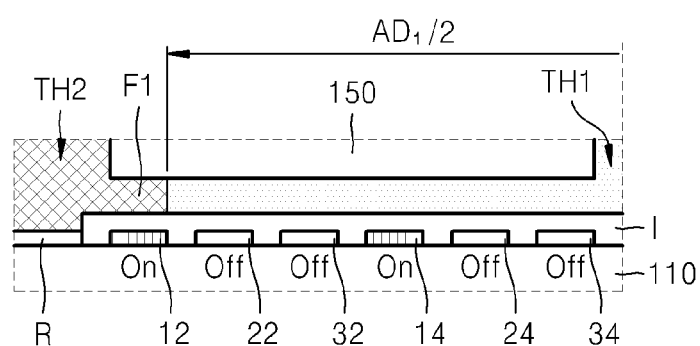
FIGS. 3A to 3F are enlarged views of the dashed portion of FIG. 2 showing that voltage control of an electrode group controls fluid flow in such a manner that the size of an aperture that transmits light is decreased in a microelectrofluidic device.

Referring to FIG. 3A, a voltage is applied to only the electrodes 12 and 14 of the first electrode unit 10. Accordingly, the interface between the first fluid F1 and the second fluid F2 is formed on the activated electrode 12, thereby forming an aperture having a radius $AD_1/2$, that is, a diameter $AD_1$. Since the electrode 22 of the second electrode unit 20 and the electrode 32 of the third electrode unit 30 are turned off, the voltage applied to the electrode 14 does not affect the fluid interface.

Figure 3B:
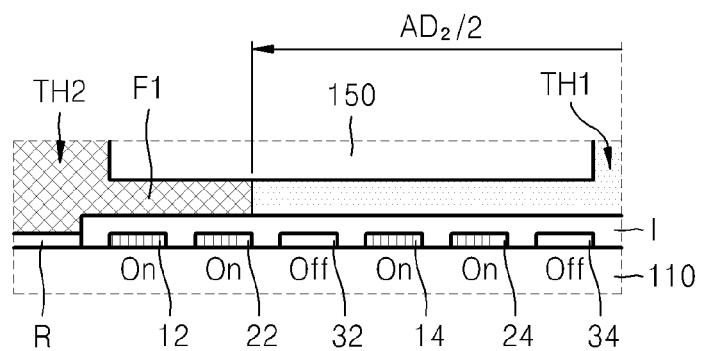

Referring to FIG. 3B, the electrodes 12 and 14 of the first electrode unit 10 and the electrodes 22 and 24 of the second electrode unit 20 are turned on, while the electrodes 32 and 34 of the third electrode unit 30 are turned off. Due to an electrochemical force affecting the TCL of FIG. 3A, the interface between the first fluid F1 and the second fluid F2 is shifted toward the electrode 22, thereby narrowing the aperture A and thus, forming an aperture with diameter $AD_2$. In this case, because the electrode 32 is turned off, the electrodes 14 and 24 do not affect the fluid interface.

Figure 3C:
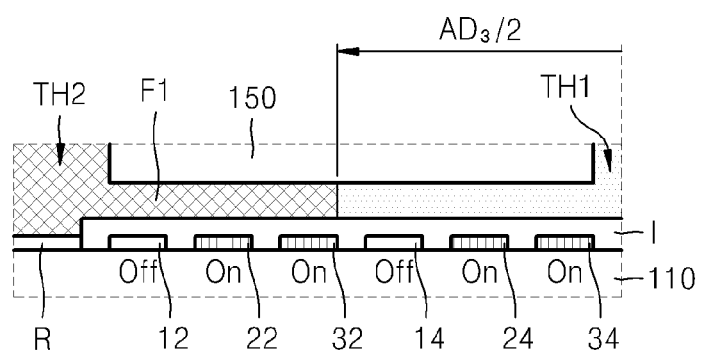

Referring to FIG. 3C, a voltage is applied to the electrodes 22 and 24 of the second electrode unit 20 and the electrodes 32 and 34 of the third electrode unit 30, while the electrodes 12 and 14 of the first electrode unit 10 are turned off. Thus, an aperture having diameter $AD_3$ is formed.

Figure 3D:
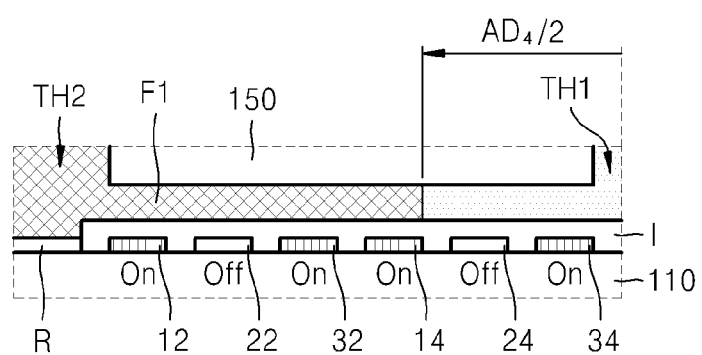
Figure 3E:
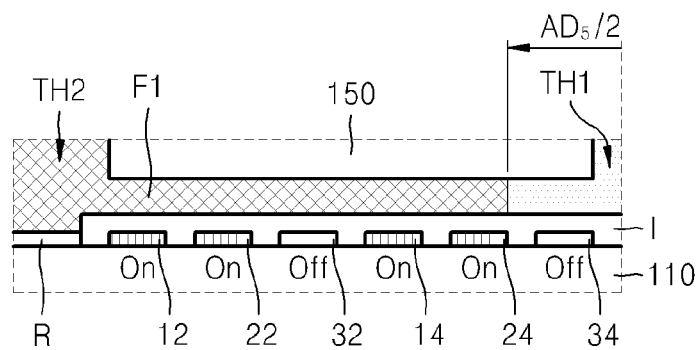
Figure 3F:
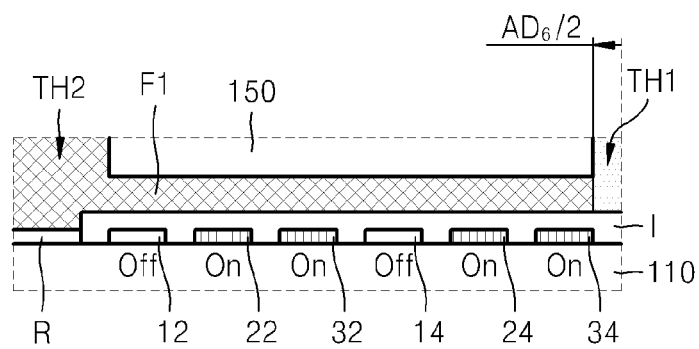

In this way, aperture diameters $AD_4$, $AD_5$, and $AD_6$, which decrease in this stated order, may also be formed by driving the electrodes in manners illustrated in FIGS. 3D, 3E, and 3F.

Driving of electrodes to increase the aperture size will now be described in detail.

Figure 4A:
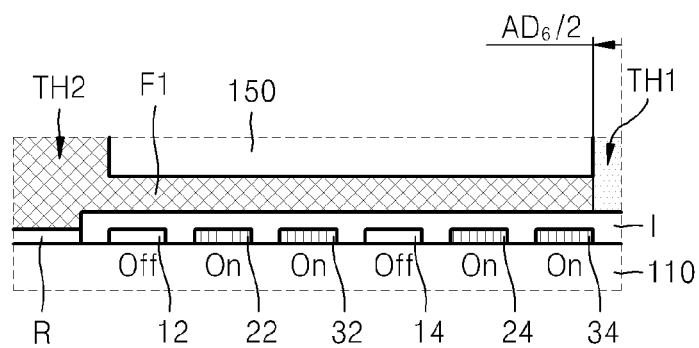
FIGS. 4A to 4F are enlarged views of the dashed portion of FIG. 2 showing that voltage control of an electrode group controls fluid flow in such a manner that the size of an aperture that transmits light is increased in a microelectrofluidic device.
Figure 4B:
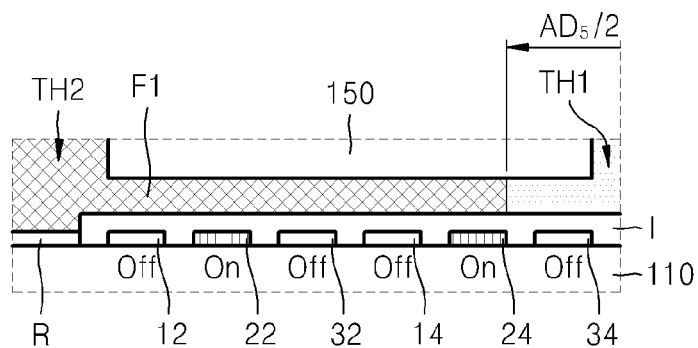
Figure 4C:
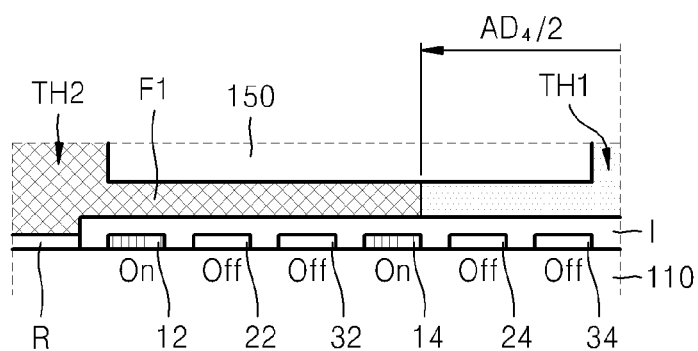

Referring to FIG. 4A, when the aperture has the diameter $AD_6$, the turning-off of the electrode 34 may result in a shift of the fluid interface toward the electrode 24 (which is turned on) as illustrated in FIG. 4B, thereby forming the aperture diameter $AD_5$. Also, in this state, when the electrode 24 is turned off and the electrode 14 is turned on, the fluid interface is shifted toward the electrode 14, as illustrated in FIG. 4C, thereby widening the diameter of the aperture to the aperture diameter $AD_4$.

Figure 4D:
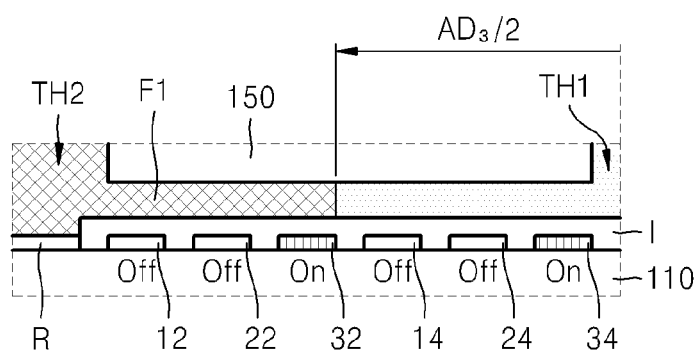
Figure 4E:
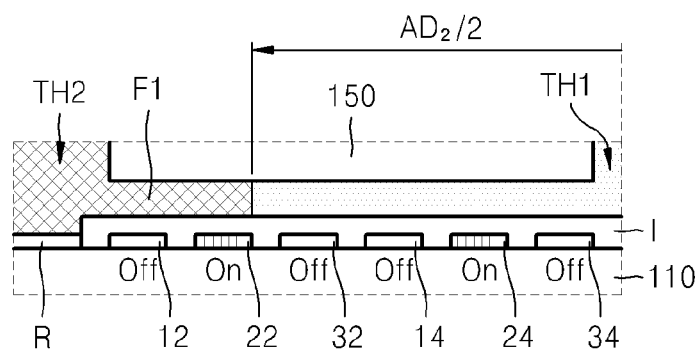
Figure 4F:
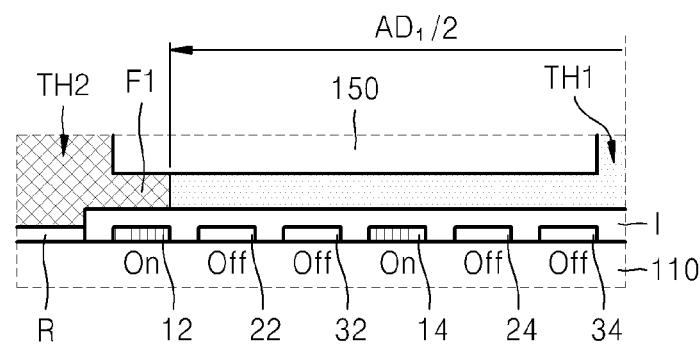

In this way, aperture diameters $AD_3$, $AD_2$, and $AD_1$, which increase in this stated order, may also be formed by driving the electrodes in the manner illustrated in FIGS. 4D, 4E, and 4F.

As described above, the aperture diameters $AD_1$, $AD_2$, $AD_3$, $AD_4$, $AD_5$, and $AD_6$ are determined according to positions of the electrodes 12, 22, 32, 14, 24, and 34 on which the fluid interface is located. To change the aperture size, as illustrated in FIGS. 3A to 4F, electrodes are driven in such a manner that the fluid interface is shifted in in accordance with the units of electrodes (10, 20, and 30). That is, if a fluid interface corresponding to an arbitrary aperture size needs to be moved to a position corresponding to a target aperture size, electrodes are sequentially driven to allow the fluid interface to move in accordance with the driven units of electrodes. For example, when the aperture diameter is changed from $AD_2$ to $AD_5$, electrodes are sequentially driven in the manner illustrated in FIGS. 3C, 3D, and 3E in this stated order. Likewise, when the aperture diameter is changed from $AD_5$ to $AD_1$, electrodes are sequentially driven in the manner illustrated in FIGS. 4B, 4C, 4D, 4E, and 4F in this stated order.

The driving of electrodes described above is a simultaneous driving of only the required electrodes when the fluid interface is shifted by a unit distance. That is, turning-on/off of a plurality of electrodes is implemented at once, and thus, fine time control, such as transient switching, is not required. As used herein, the term "transient switching" refers to electrode control in which when two electrode modes are used to change the location of a fluid interface, initially, two adjacent electrodes are turned on at once, and once the fluid begins to flow, one of the electrodes is turned off to stop the fluid in a position corresponding to the other electrode. However, such driving requires fine timing control. In addition, the control time may vary according to the electrodes corresponding to the respective aperture sizes, which makes the driving complicated. If a plurality of electrodes included in an electrode group are independently driven, transient switching may not be required. In this case, however, the electrodes may have a very complicated array.

Figure 5:
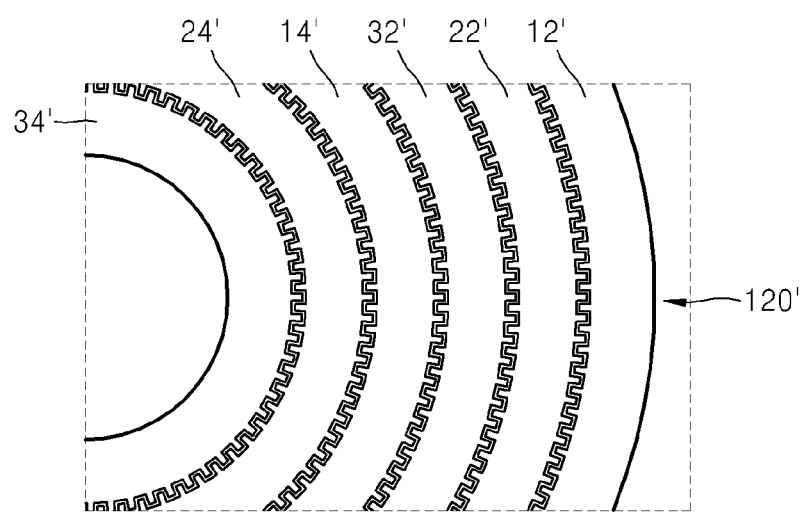
FIG. 5 illustrates a modified example of an electrode group that is employable in the microelectrofluidic device of FIG. 1.

FIG. 5 illustrates an electrode group 120' as exemplary modification of the first electrode group 120 of the microelectrofluidic device 100.

Referring to FIG. 5, the first electrode group 120' includes a plurality of electrodes 12', 22', 32', 14', 24', and 34' and adjacent facing surfaces of the electrodes 12', 22', 32', 14', 24', and 34' have uneven patterns that intervene between each other. Such uneven patterns make a TCL, that is, a line where the first fluid F1, the second fluid F2, and the insulating material I join together, to be formed over two electrodes, so that the fluid interface is allowed to move easily in response to appliance of voltage.

Figure 6:
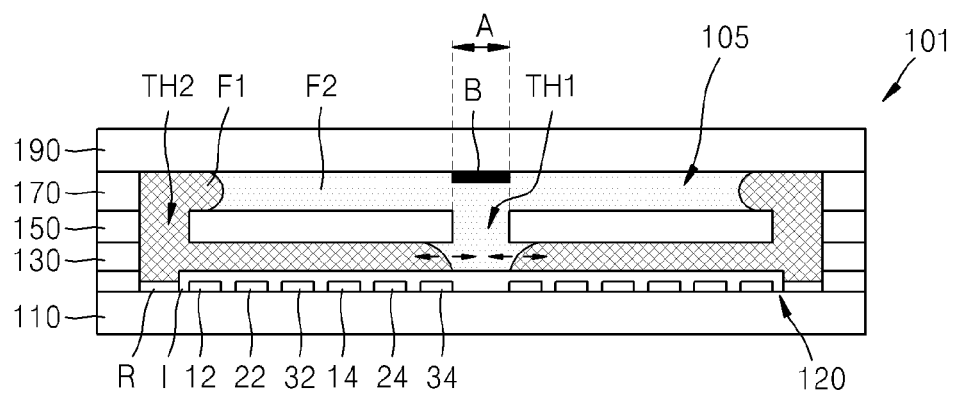
FIG. 6 is a schematic cross-sectional view of a microelectrofluidic device according to another embodiment.

FIG. 6 is a schematic cross-sectional view of a microelectrofluidic device 101 according to another embodiment.

In this embodiment the microelectrofluidic device 101 also functions as a shutter because the aperture A is completely shielded. Thus, an opaque pattern portion B may be further formed at the center of the top substrate 190, and may shield light that has passed through the aperture A that is defined according to the location of the interface between the first fluid F1 and the second fluid F2. In certain embodiments, the opaque pattern portion B may be formed to a size corresponding to a minimum size of the aperture that is defined according to the flow of the first and second fluids (F1 and F2). That is, when the fluid interface is shifted as close as possible to the center by driving electrodes of the first electrode group 120 to form a minimum aperture, light that has passed through the minimum aperture is shielded by the opaque pattern portion B.

Figure 7:
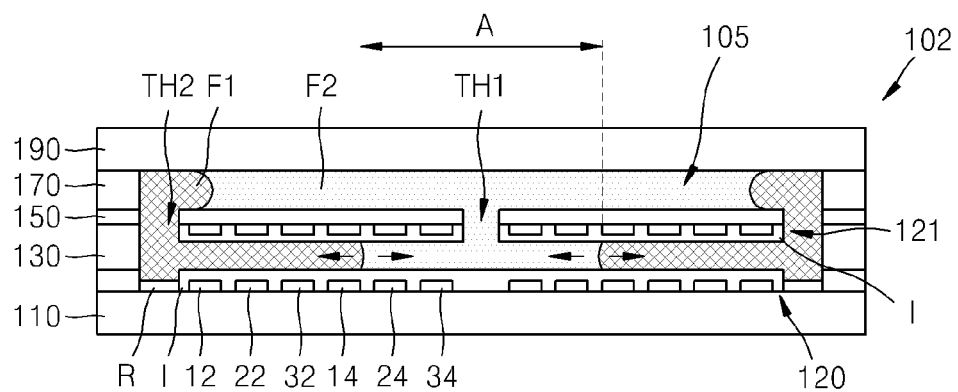
FIG. 7 is a schematic cross-sectional view of a microelectrofluidic device according to another embodiment.

FIG. 7 is a schematic cross-sectional view of a microelectrofluidic device 102 according to another embodiment.

In this embodiment, a second electrode group 121 having the same electrode array structure as that of the first electrode group 120 is disposed on a lower surface of the intermediate plate 150 of the microelectrofluidic device 102. The second electrode group 121, together with the first electrode group 120, may collectively contribute to an increase in driving force of the fluid interface.

Figure 8:
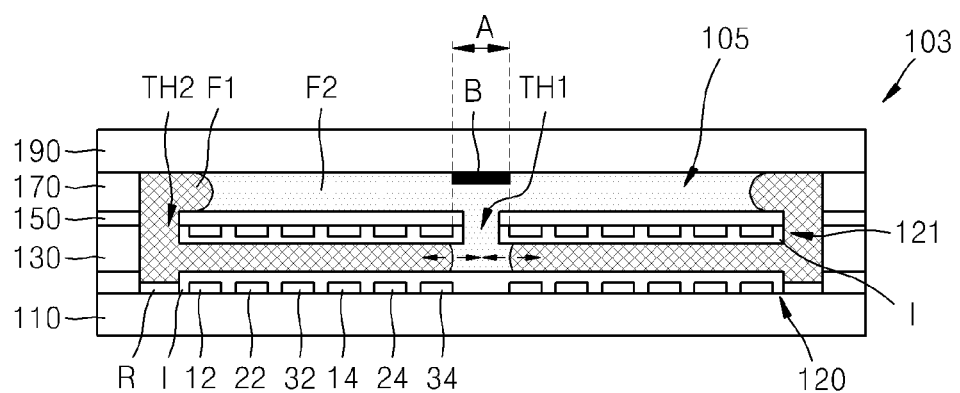
FIG. 8 is a schematic cross-sectional view of a microelectrofluidic device according to another embodiment.

FIG. 8 is a schematic cross-sectional view of a microelectrofluidic device 103 according to another embodiment.

In this embodiment, an opaque pattern portion B is further formed on the top substrate 190 of the microelectrofluidic device 103 to allow the microelectrofluidic device 103 to function as a shutter because the aperture A is completely shielded.

Figure 9:
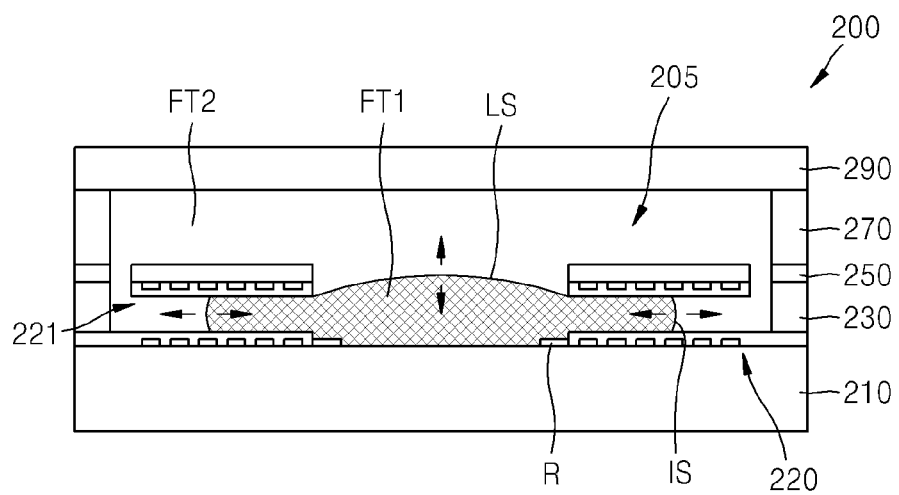
FIG. 9 is a schematic cross-sectional view of a microelectrofluidic device according to another embodiment.
Figure 10:
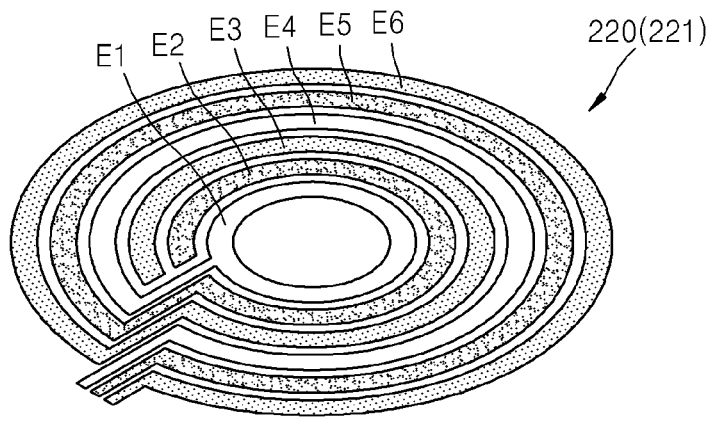
FIG. 10 is a detailed view of an electrode group of the microelectrofluidic device of FIG. 9.

FIG. 9 is a schematic cross-sectional view of a microelectrofluidic device 200 according to another embodiment, and FIG. 10 is a detailed view of an electrode group of the microelectrofluidic device 200 of FIG. 9.

The microelectrofluidic device 200 according to this exemplary embodiment functions as a curvature adjusting device.

That is, the first fluid FT1 and the second fluid FT2 contained in the chamber 205 are light-transmitting materials, each having a different refractive index. An interface between the first fluid FT1 and the second fluid FT2 in the chamber 205 may include a lens surface LS and a driving surface IS that derives a curvature change of the lens surface LS. The first fluid FT1 may be a polar material and the second fluid FT2 may be a non-polar material. The driving surface IS contacts the electrode group and moves towards opposite sides or towards the center of the chamber 205 by electrowetting, thereby controlling the curvature of the lens surface LS.

The structure and operation of the microelectrofluidic device 200 will now be described in detail.

The chamber 205 includes a bottom substrate 210 having a lower surface on which a first electrode group 220 is disposed, a first intermediate plate 250 that is disposed above and spaced apart from the bottom substrate 210 and has a first through-hole that forms a lens diameter corresponding to the lens surface LS and is located at the center portion of the first intermediate plate 250 and a second through-hole that forms a flow path for the second fluid FT2 and is located at the circumference portion of the first intermediate plate 250, a top substrate 290 that is disposed above and spaced apart from the first intermediate plate 250, and a spacer surrounding a space formed between the bottom substrate 210 and the top substrate 290. The spacer includes a first spacer 230 disposed between the bottom substrate 210 and the first intermediate plate 250 and a second spacer 270 disposed between the first intermediate plate 250 and the top substrate 290.

A second electrode group 221 having the same electrode array as that of the first electrode group 220 may be disposed on a lower surface of the first intermediate plate 250. However, this structure is only an example, and in other embodiments, only one of the first electrode group 220 or the second electrode group 221 may be used.

The first electrode group 220 and the second electrode group 221 may each have the same structure as used in the electrode groups described in the previous exemplary embodiments. That is, each of the first electrode group 220 and the second electrode group 221 includes a plurality of electrodes E1, E2, E3, E4, E5, and E6 that are connected to one of three electrode units that are independently turned on or off, and the electrodes E1, E2, E3, E4, E5, and E6 may be coated with an insulating material I. Also, each of the first electrode group 220 and the second electrode group 221 has a single-layer array structure, and from among the electrodes E1, E2, E3, E4, E5, and E6, adjacent electrodes may be connected to different electrode units. For example, from among the electrodes E1, E2, E3, E4, E5, and E6, electrodes E3 and E6 that are located in (3 k)th places (where k is a natural number) in a direction away from the center of the corresponding electrode group may be connected to each other; the electrodes E2 and E5 that are located in (3 k-1)th places (where k is a natural number) from the center may be connected to each other; and the electrodes E1 and E4 that are located in (3 k-2)th places (where k is a natural number) from the center may be connected to each other.

The number or array of electrodes of the first electrode group 220 and the second electrode group 221 are not limited to the illustrated structure. The electrodes may be arranged in any type of array as long as adjacent electrodes are connected to different electrode units, and the electrodes may have various shapes, such as circular or polygonal shapes. In addition, the electrodes may have an uneven pattern as illustrated in FIG. 5.

A ground electrode R may be disposed in at least a portion of the inside of the chamber 205, and maintain contact with a polar fluid. For example, the ground electrode R may be disposed and maintain contact with the polar first fluid FT1, and as illustrated, may be disposed on the bottom substrate.

FIGS. 11A to 11F are enlarged views of a portion of the microelectrofluidic device of FIG. 9 showing that voltage control of an electrode group controls fluid flow in such a manner that the curvature of a lens surface is gradually changed from convex to concave.

Figure 11A:
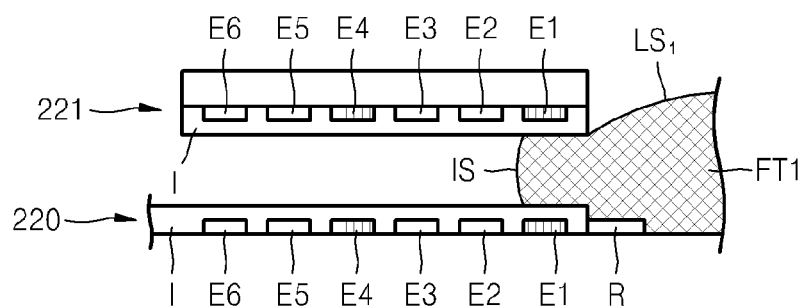
FIGS. 11A to 11F are enlarged views of a portion of the microelectrofluidic device of FIG. 9 showing that voltage control of an electrode group controls fluid flow in such a manner that a curvature of a lens surface is gradually changed from convex to concave.

Referring to FIG. 11A, the electrode E1 is turned on and the driving surface IS is formed corresponding to the electrode E1, thereby forming a lens surface $LS_1$. Although the electrode E4 connected to the electrode E1 is turned on, because the electrodes E2 and E3 are turned off, the driving surface IS is maintained corresponding to the electrode E1.

Figure 11B:
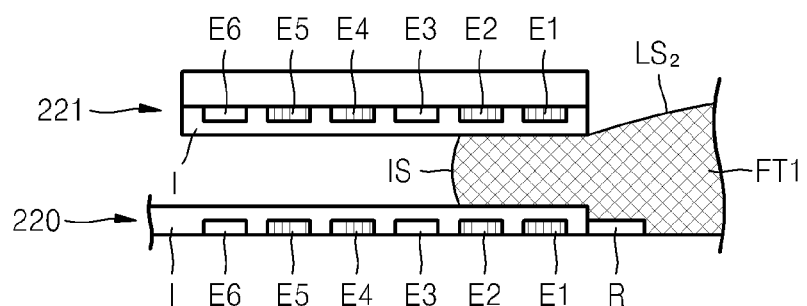

Referring to FIG. 11B, the electrode E2 is turned on and the driving surface IS is shifted toward the electrode E2. Although the electrodes E4 and E5 connected to the electrodes E1 and E2 are turned on, because the electrode E3 is turned off, the motion of the driving surface IS is stopped where the electrode E2 is located. According to the location of the driving surface IS, a lens surface $LS_2$ that has a greater curvature radius than the lens surface $LS_1$ is formed.

Figure 11C:
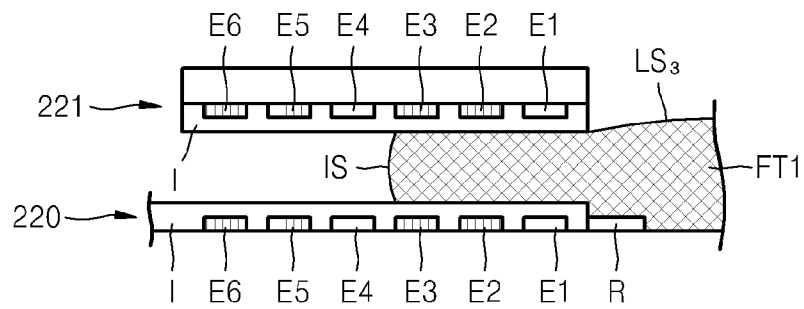

Referring to FIG. 11C, the electrode E3 is turned on and the electrode $E_1$ is turned off. Thus, the electrode E4 connected to the electrode $E_1$ is turned off. Accordingly, the driving surface IS stops its motion where the electrode E3 is located, thereby forming a lens surface $LS_3$ that has a greater curvature radius than the lens surface $LS_2$.

Figure 11D:
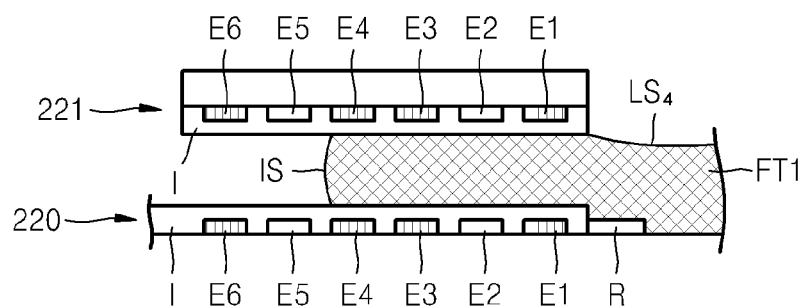
Figure 11E:
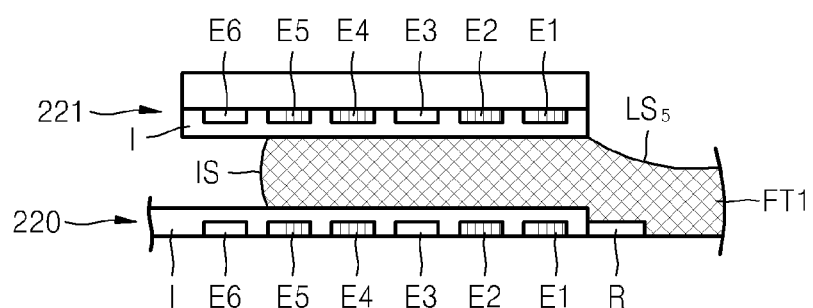
Figure 11F:
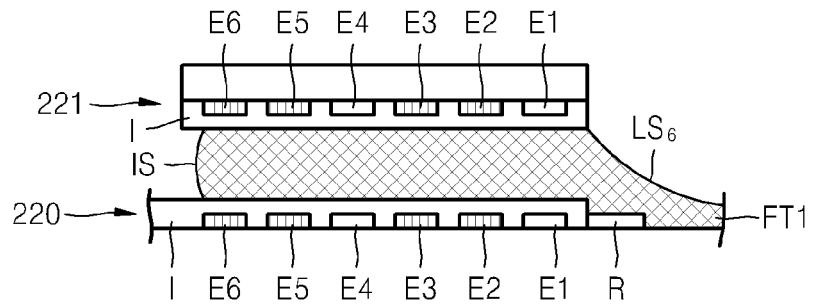

In this way, as illustrated in FIGS. 11D to 11F, the driving surface IS moves toward the edge of the chamber 205 and thus, a concave lens surface $LS_4$ that has an inverted curvature direction, and lens surfaces $LS_5$ and $LS_6$, of which curvature radii gradually decrease, are formed.

FIGS. 12A to 12F are enlarged views of a portion of the microelectrofluidic device 200 of FIG. 9 showing that voltage control of an electrode group controls fluid flow in such a manner that the curvature of a lens surface is gradually changed from concave to convex.

Figure 12A:
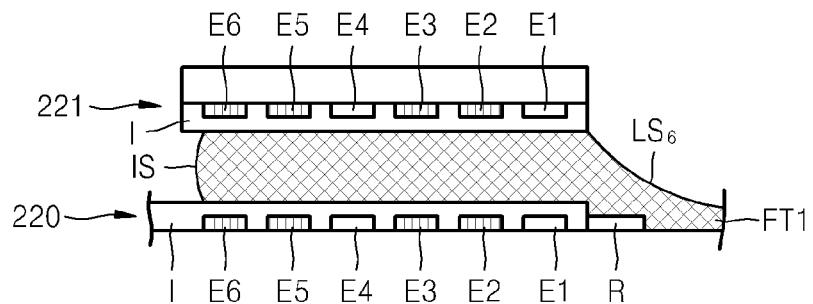
FIGS. 12A to 12F are enlarged views of a portion of the microelectrofluidic device of FIG. 9 showing that voltage control of an electrode group controls fluid flow in such a manner that a curvature of a lens surface is gradually changed from concave to convex.
Figure 12B:
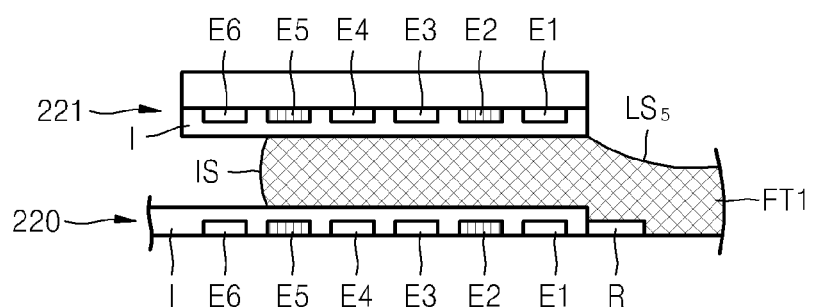
Figure 12C:
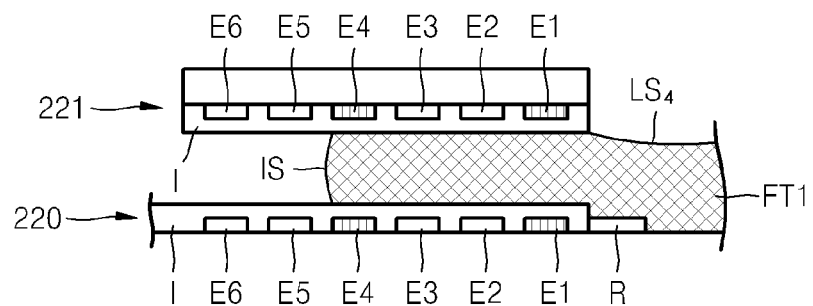
Figure 12D:
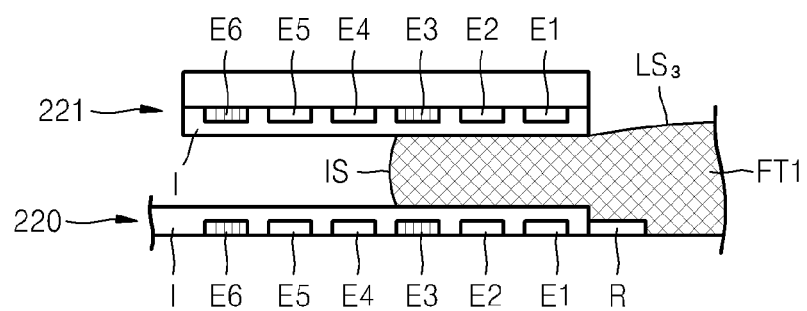
Figure 12E:
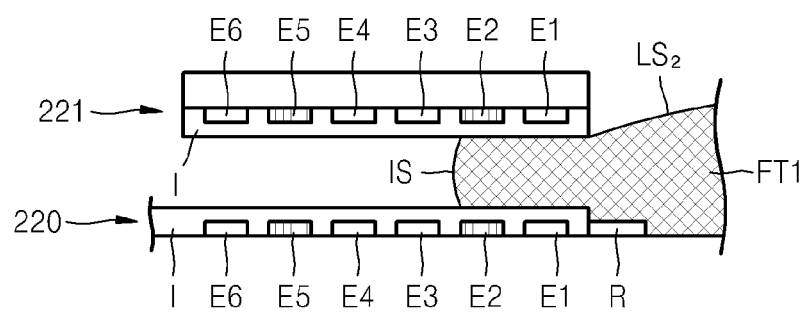
Figure 12F:
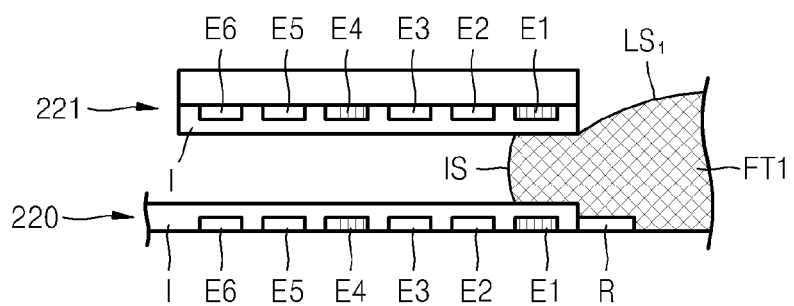

The lens surface $LS_6$ corresponding to the electrode state illustrated in FIG. 12A is shifted toward the electrode E5 as illustrated in FIG. 12B when the electrode E6 is turned off. When the electrode E6 is turned off, the electrode E4 is also turned off. Thus, the motion of the driving surface IS is stopped where the electrode E5 is located, thereby forming the lens surface $LS_5$.

In this way, as illustrated in FIGS. 12B to 12F, the driving surface IS is shifted toward the center and thus, the lens surfaces $LS_4$, $LS_3$, $LS_2$, and $LS_1$ are sequentially formed in this stated order.

Figure 13A:
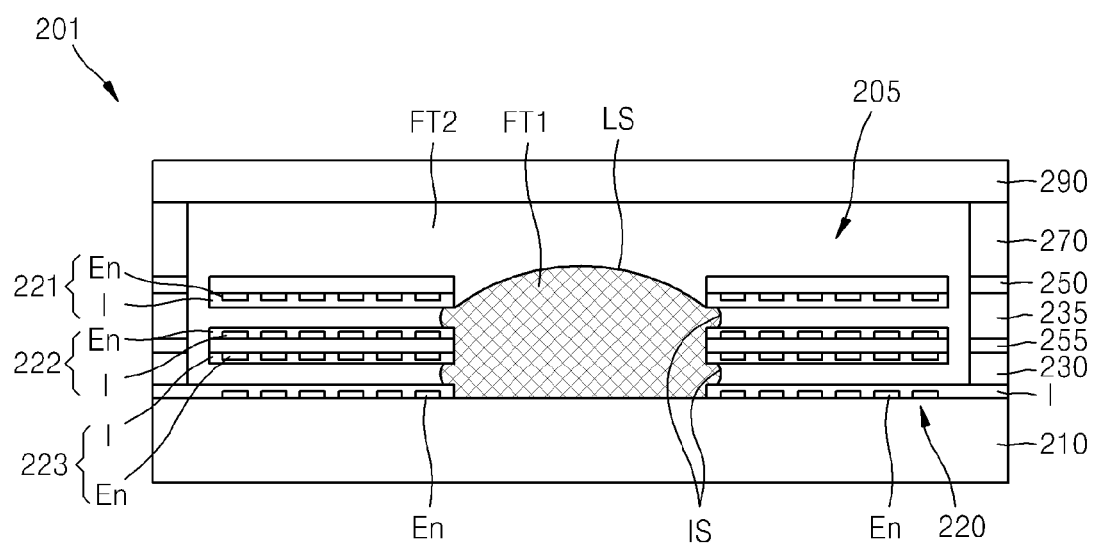
FIGS. 13A and 13B are schematic cross-sectional views of a microelectrofluidic device according to another exemplary embodiment, wherein the microelectrofluidic device has different lens surface curvatures.
Figure 13B:
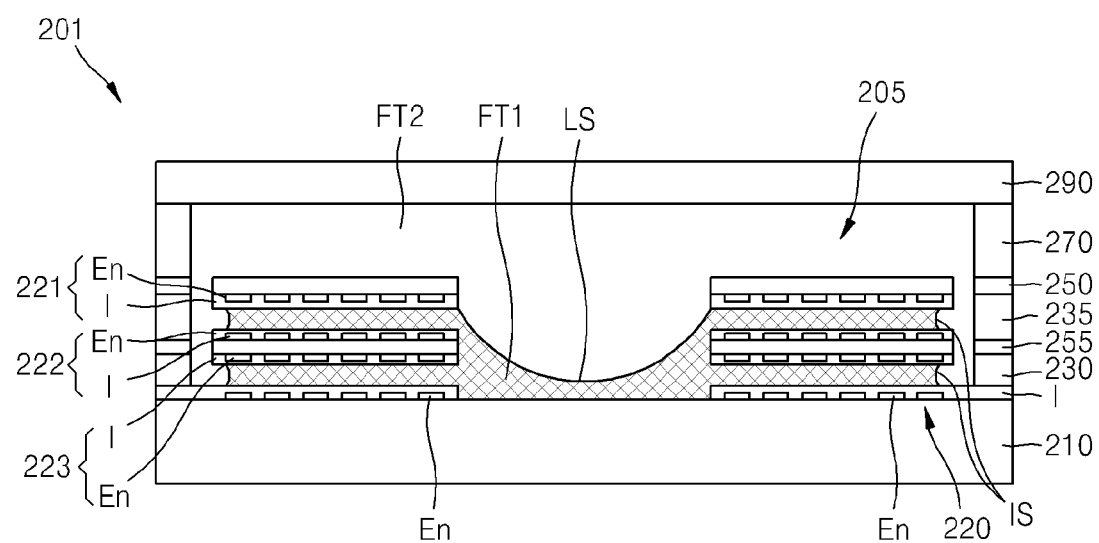

As described above, according to the electrodes E1, E2, E3, E4, E5, and E6 on which the driving surface IS is located, lens surfaces $LS_1$, $LS_2$, $LS_3$, $LS_4$, $LS_5$, and $LS_6$ that have different curvatures are determined. To change the curvature of a lens surface, as illustrated in FIGS. 11A to 11F, electrodes are driven in such a way that the driving surface IS is shifted in units of electrodes. The driving of electrodes described above is a simultaneous driving of only the required electrodes when the driving surface IS is shifted by a unit distance. That is, as described in previous exemplary embodiments, fine timing control, such as transient switching is not required FIGS. 13A and 13B are schematic cross-sectional views of a microelectrofluidic device 300 according to another embodiment, wherein the microelectrofluidic device has different curvatures of a lens surface.

This embodiment is provided to maximize a change in curvature of a lens surface. Thus, the microelectrofluidic device 300 further includes a second intermediate plate 255 interposed between the bottom substrate 210 and the first intermediate plate 250. The second intermediate plate 255 has through-holes respectively corresponding to the first and second through-holes of the first intermediate plate 250. A third spacer 235 is disposed between the first intermediate plate 250 and the second intermediate plate 255. Although only one second intermediate plate 255 is illustrated, this structure is only an example, and a plurality of second intermediate plates 255 may be included.

In this embodiment, the electrode group may include a first electrode group 220 that is formed on an upper surface of the bottom substrate 210 and includes a plurality of electrodes En that are coated with an insulating material I, a second electrode group 221 that is formed on a lower surface of the first intermediate plate 250 and includes a plurality of electrodes En that are coated with an insulating material I, a third electrode group 222 that is formed on an upper surface of the second intermediate plate 255 and includes a plurality of electrodes En that are coated with an insulating material I, and a fourth electrode group 223 that is formed on a lower surface of the second intermediate plate 255 and a plurality of electrodes En that are coated with an insulating material I. Electrodes of the electrode group may have substantially the same array as illustrated in FIG. 9, and the array may be modified as illustrated in FIG. 5. As described herein, the third electrode group 222 and the fourth electrode group 223 are respectively disposed on the upper and lower surfaces of the second intermediate plate 255. However, in certain embodiments, an electrode group may be formed on only one of the upper or lower surfaces of the second intermediate plate 255.

A ground electrode (not shown) may be disposed in such a position that the ground electrode contacts the first fluid FT1 when a voltage is not applied.

As discussed above, the microelectrofluidic device according to the above exemplary embodiments control fluid flow by electrowetting, and by doing so, high control speed and low power consumption are obtained.

Also, because multiple (e.g., three) independently controllable electrode modes are used to achieve digitized control, a simpler structure may be obtained than when all electrodes are independently driven. In addition, transient switching, which is required when two electrode modes are used, is unnecessary, thereby simplifying voltage control.

It should be understood that the exemplary embodiments described herein should be considered in a descriptive sense only and not for purposes of limitation. Descriptions of features or aspects within each embodiment should be considered as available for other similar features or aspects in other embodiments.

What is claimed is:

1. A microelectrofluidic device comprising:
   a chamber;
   a first fluid and a second fluid which are contained in the chamber and are not mixable with each other; and
   a first electrode group comprising a plurality of electrodes that are disposed on an inner side of the chamber, and to which a voltage is applied to change an interface between the first fluid and the second fluid,
   wherein the plurality of electrodes are connected to form a first electrode unit, a second electrode unit, and a third electrode unit that are independently turned on or off, and
   wherein the plurality of electrodes are annular and coated with an insulating material, and adjacent electrodes of the plurality of electrodes are connected to different electrode units.

2. The microelectrofluidic device of claim 1, wherein the first electrode group has a single-layer array structure.

3. The microelectrofluidic device of claim 2, wherein:
   electrodes, among the plurality of electrodes, that are located in $(3k)^{th}$ places in a direction away from a center of the first electrode group constitute a first electrode unit, where k is a natural number;
   electrodes, among the plurality of electrodes, that are located in $(3k-1)^{th}$ places from the center of the first electrode group constitute a second electrode unit; and
   electrodes, among the plurality of electrodes, that are located in $(3k-2)^{th}$ places (from the center of the first electrode group constitute a third electrode unit.

4. The microelectrofluidic device of claim 3, wherein adjacent facing surfaces of the electrodes have uneven patterns.

5. The microelectrofluidic device of claim 3, wherein the first fluid comprises a light-shielding material, the second fluid comprises a light-transmitting material, and a diameter of an aperture that transmits incident light is controlled according to a position change of the interface between the first fluid and the second fluid.

6. The microelectrofluidic device of claim 5, wherein one of the first fluid and the second fluid comprises a polar material, and the other one of the first fluid and the second fluid comprises a non-polar material.

7. The microelectrofluidic device of claim 6, wherein the chamber comprises:
   a bottom substrate having an upper surface on which the first electrode group is disposed;
   an intermediate plate that is disposed above and spaced apart from the bottom substrate, the intermediate plate comprises a first through-hole that forms a flow path for the first fluid at a center portion of the intermediate plate and a second through-hole that forms a flow path for the second fluid at a circumferential portion of the intermediate plate;
   a top substrate that is disposed above and spaced apart from the intermediate plate; and
   a spacer that surrounds a space formed between the bottom substrate and the top substrate.

8. The microelectrofluidic device of claim 7, further comprising a second electrode group comprising a plurality of electrodes that are disposed on a lower surface of the intermediate plate, wherein the second electrode group has a single-layer array structure that is the same as that of the first electrode group.

9. The microelectrofluidic device of claim 7, wherein an opaque pattern is formed on a center of a surface of the top substrate, wherein the opaque pattern shields light that has passed through the aperture.

10. The microelectrofluidic device of claim 7, further comprising a ground electrode that is disposed on a surface of the bottom substrate, wherein the ground electrode contacts a polar fluid among the first fluid and the second fluid.

11. The microelectrofluidic device of claim 3, wherein the first fluid and the second fluid comprise light-transmitting materials, each having a different refractive index,
   the interface between the first fluid and the second fluid in the chamber comprises a first surface that constitutes a lens surface and a second surface that contacts the electrode group, and
   according to how a voltage applied to the first electrode group is controlled, the position of the second surface is changed, thereby changing the curvature of the lens surface.

12. The microelectrofluidic device of claim 11, wherein the first fluid comprises a polar material and the second fluid comprises a non-polar material.

13. The microelectrofluidic device of claim 11, wherein the chamber comprises:
 a bottom substrate having an upper surface on which the first electrode group is disposed;
 an intermediate plate that is disposed above and spaced apart from the bottom substrate and comprises a first through-hole that forms a lens diameter corresponding to the lens surface at a center portion of the intermediate plate and a second through-hole that forms a flow path for the second fluid at a circumferential portion of the intermediate plate;
 a top substrate that is disposed above and spaced apart from the intermediate plate; and
 a spacer that surrounds a space formed between the bottom substrate and the top substrate.

14. The microelectrofluidic device of claim 13, further comprising a second electrode group comprising a plurality of electrodes that are disposed on a lower surface of the intermediate plate, wherein the second electrode group has a single-layer array structure that is the same as that of the first electrode group.

15. The microelectrofluidic device of claim 13, further comprising a ground electrode that is located on a surface of the bottom substrate, wherein the ground electrode contacts a polar fluid among the first fluid and the second fluid.

16. The microelectrofluidic device of claim 14, further comprising a second intermediate plate interposed between the bottom substrate and the first intermediate plate, wherein the second intermediate plate comprises through-holes respectively corresponding to the first and second through-holes of the first intermediate plate.

17. The microelectrofluidic device of claim 16, further comprising a third electrode group comprising a plurality of electrodes that are disposed on an upper or lower surface of the second intermediate plate, wherein the third electrode group has a single-layer array structure that is the same as that of the first electrode group.

18. A method of changing a location of an interface between a first fluid and a second fluid that are not mixable and are contained in a chamber of in a microelectrofluidic device, wherein the microfluidic device includes an electrode group including a plurality of electrodes that have different annular shapes and are spaced apart from each other, the method comprising:
 controlling the electrodes to have a same voltage as any one of a first electrode unit, a second electrode unit, and a third electrode unit which are independently turned on or off, wherein adjacent electrodes among the electrodes are controlled according to different electrode units.

19. The method of claim 18, wherein the electrode group has a single-layer array structure.

20. The method of claim 19, wherein:
 electrodes, among the plurality of electrodes, that are located in $(3k)^{th}$ places in a direction away from the center of the electrode group are controlled according to the first electrode unit, where k is a natural number;
 electrodes, among the plurality of electrodes, that are located in $(3k-1)^{th}$ places from the center of the electrode group are controlled according to the second electrode unit; and
 electrodes, among the plurality of electrodes, that are located in $(3k-2)^{th}$ places from the center of the electrode group are controlled according to the third electrode unit.

21. The method of claim 20, wherein the turning on or off of the first electrode unit, the second electrode unit, and the third electrode unit are simultaneously performed without transient switching.

22. The method of claim 21, wherein the first fluid comprises a light-shielding material and the second fluid comprises a light-transmitting material, and according to the position of the interface between the first fluid and the second fluid, a diameter of an aperture that transmits incident light is controlled.

23. The method of claim 21, wherein the first fluid and the second fluid comprise light-transmitting materials, each having a different refractive index,
 the interface between the first fluid and the second fluid in the chamber comprises a first surface that constitutes a lens surface and a second surface that contacts the electrode group, and
 according to how a voltage applied to the first electrode group is controlled, the position of the second surface is changed, thereby changing the curvature of the lens surface.

* * * * *